United States Patent [19]

Lynn et al.

[11] 4,391,675
[45] Jul. 5, 1983

[54] SIEVE PLATES AND DISTILLATION COLUMNS

[75] Inventors: Malcolm Lynn, Preston, near Hull; Peter E. May, Keyingham, both of England

[73] Assignee: BP Chemicals Limited, London, England

[21] Appl. No.: 337,324

[22] Filed: Jan. 5, 1982

[30] Foreign Application Priority Data

Jan. 8, 1981 [GB] United Kingdom ................ 8100606
Oct. 3, 1981 [GB] United Kingdom ................ 8129924

[51] Int. Cl.³ .............................................. B01D 3/14
[52] U.S. Cl. .................................. 202/158; 261/114 R
[58] Field of Search ..... 261/114 R, 114 VT, 114 TC; 202/158; 196/110, 111, 133

[56] References Cited

U.S. PATENT DOCUMENTS 4,273,618 6/1981 Strang .......................... 261/114 TC

*Primary Examiner*—Frank Sever
*Attorney, Agent, or Firm*—Brooks, Haidt, Haffner & Delahunty

[57] ABSTRACT

A sieve plate of polymeric material for use in a distillation column, characterized in that said plate comprises:
(a) a circular base portion provided with
  (i) a central axial aperture adapted to receive a shaft,
  (ii) an additional aperture capable of receiving a tubular member, and
  (iii) a plurality of perforations such that the perforations represent in total a free area of between 3 and 20%, the perforations having a uniform average diameter between 0.6 and 4.0 mm,
(b) a flexible, flared-lip portion around the circumference of the base portion capable of sealing contact with the inner walls of a column, and
(c) means for retaining the sieve plate on a shaft.

10 Claims, 4 Drawing Figures

SIEVE PLATES AND DISTILLATION COLUMNS

The present invention relates to sieve plates made of polymeric material, suitable for use in distillation columns.

In the past, distillations have been carried out, especially on a laboratory scale, in columns with glass plates e.g. columns of the Oldershaw type. These distillations are normally restricted to atmospheric or sub-atmospheric pressures which are the safe working pressures for columns with glass plates. Apart from this restriction, columns with glass plates have other limitations. For instance, in conventional columns with glass plates the number of plates and the plate-spacing are both fixed and neither of these can be altered to suit the specific distillation requirements of a given fluid. Moreover, glass plates for such columns are not easily mass produced.

It is an object of the present invention to design a sieve plate and a distillation column which mitigates the disadvantages of the prior art columns without any substantial loss of efficiency.

Accordingly, the present invention comprises a sieve plate of polymeric material for use in a distillation column, characterised in that said plate comprises:
(a) a circular base portion provided with
   (i) a central axial aperture adapted to receive a shaft,
   (ii) an additional aperture capable of receiving a tubular member, and
   (iii) a plurality of perforations such that the perforations represent in total a free area of between 3 and 20%, the perforations having a uniform average diameter between 0.6 and 4.0 mm,
(b) a flexible, flared-lip portion around the circumference of the base portion capable of sealing contact with the inner walls of a column, and
(c) means for retaining the sieve plate on a shaft.

According to a further embodiment, the present invention is a distillation column which is provided with a plurality of spaced sieve plates, characterised in that the sieve plates are of polymeric material and are mounted on a central shaft coaxial with the column, said sieve plate comprising:
(a) a circular base portion provided with
   (i) a central axial aperture adapted to receive the shaft,
   (ii) an additional aperture spaced from the central aperture and capable of receiving a tubular member acting as a weir and a downcomer, and
   (iii) a plurality of perforations such that the perforations represent in total a free area of between 3 and 20%, the perforations having a uniform average diameter between 0.6 and 4.0 mm,
(b) a flexible, flared lip-portion around the circumference of the base capable of sealing contact with the inner walls of the column, and
(c) means for retaining the plate on the shaft.

The polymeric material of which the sieve plate is made is suitably a fluoro-olefin polymer, for example polytetrafluoroethylene (PTFE), polyvinylidene fluoride (PVDF) or polyolefins such as polypropylene.

The circular base portion of the sieve-plate has a central axial aperture adapted to receive a shaft. The shaft is used to enable the plates to be mounted in a distillation column and to enable the plates to retain their orientation and spacing with respect to the column. This latter aspect is critical for obtaining consistent and reproducible results.

Apart from the central axial aperture, the base portion has an additional aperture spaced therefrom. The additional aperture is adapted to receive a tubular member. The tubular member in this instance acts as a weir and a downcomer. That is, when in its upright position, the part of the tubular member projecting above the base portion acts as a weir and that projecting below the base portion acts as a downcomer for the next plate below. The length of the tubular member may be varied on either side of the plate to adjust the weir height or the length of the downcomer. The tubular member is preferably constructed of a different material to that of which the sieve plate is made, such as glass. A combination of PTFE sieve plates and glass tubular members is particularly preferred.

The base portion also has several perforations. The number and diameter of perforations on the base portion will be determined by the "percentage free area" desired. The percentage free area is defined as the fraction of available column cross-sectional area available for bubbling, i.e.

$$[(N \times Ao)/(Ac - 2A_d - A_s)] \times 100$$

wherein
n is the number of perforations in the sieve plate
Ao is the area of one perforation
Ac is the internal cross-sectional area of the column
$A_d$ is the area of a cross-section of the downcomer, and
$A_s$ is the area of the cross-section of the central shaft.

The perforations represent a free area of between 3 and 20%, suitably between 8 and 15%, preferably between 10 and 12%.

The average diameter of the perforations is between 0.6 and 4.0 mm, preferably between 0.9 and 3.0 mm.

The perforations are suitably distributed in such a manner that a small segment of the base portion is left unperforated. In the column alternate plates are preferably arranged so that the liquid descending from the plate immediately above through the downcomer is directed to this unperforated area so as to distribute gradually and substantially evenly the liquid over the perforated bubbling area. Such an arrangement minimises the interference to the bubbling efficiency of the plate caused by the downcoming liquid.

The flexible, flared-lip portion is designed to make a sealing contact between the inner wall of the column and the plate and to allow for irregularities in the wall of the column.

The means for retaining the sieve-plate on the shaft may be any conventional type known to those skilled in the art. For example, it may be a combination of a coaxial boss with a pair of opposing holes on the plates and correspondingly aligned holes on the shaft so that a cross-pin or lock-pin can be inserted through the holes in the boss and the shaft to retain the plate in position. The boss in such a case is preferably on the side of the plate opposite that bearing the lip-portion, i.e. on the lower side of the plate as installed in the column.

Alternatively, the shaft and the axial aperture in the plate may have between them a combination of an annular slot and a flange which mate to form the retaining means. The flange may be either an O-ring or an integral projection on the appropriate shaft or plate aperture.

Whichever retaining means is used, it is preferable that the shaft and the plate form a sealing contact so that the vapour/liquid contact through the bubbling area of the plate is maximised.

For the purposes of mounting several such plates on the shaft and in order to provide the added flexibility of adjusting the space between the plates as necessary, the shaft may be provided along its length with a series of such means e.g. flange, annular slots or holes. This feature together with the adjustability of the weir height and downcomer length provides a distillation column adaptable for distilling a variety of liquids.

The distillation column is formed by mounting on a central shaft a series of sieve plates according to the present invention equipped with downcomers and inserting the shaft in a cylindrical tube of appropriate dimensions. Suitable internal column diameters are for instance from 20 mm to 75 mm, preferably from 40 mm to 60 mm. The columns may be made of any suitable material such as glass or metal.

The sieve-plates and the distillation columns containing such plates are described below with reference to the accompanying drawings.

Figure 1:
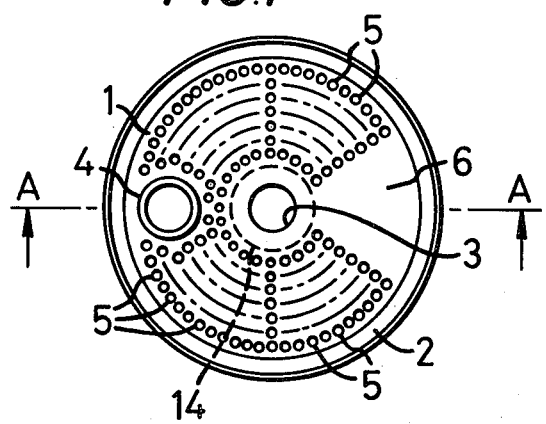
FIG. 1 shows a plan view of the sieve plate with the tubular member.
Figure 2:
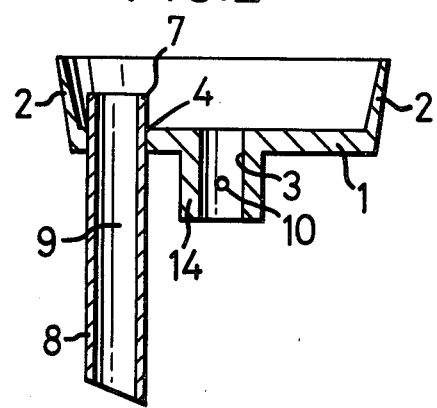
FIG. 2 shows a sectional view of FIG. 1 along the line A—A.
Figure 3:
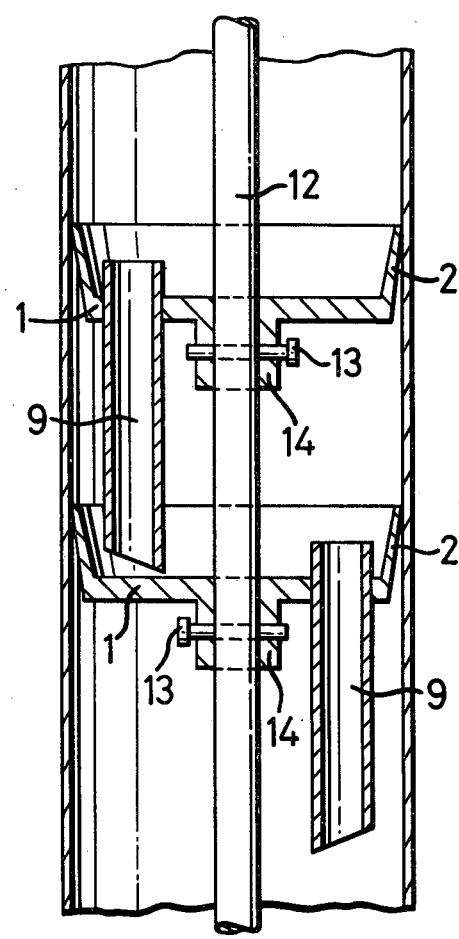
FIG. 3 shows a sectional view of the plates mounted on a shaft and inserted into a distillation column.

In the drawings, the sieve plate made of polytetrafluoroethylene has a circular base portion 1 of about 47 mm diameter, a flared, flexible lip-portion 2 of height about 10 mm, a central axial aperture 3 of 6 mm internal diameter and an additional aperture 4 spaced from the central aperture of diameter 9 mm. The base portion also has a number of perforations 5, 1.1 mm in diameter on a pitch of approximately 2 mm. A segment 6 of the base portion is free of perforations. The side of the base portion opposite the lip-portion has an axial boss 14 which is provided with a pair of opposing holes 10 for receiving the lockpin 13. In the additional aperture 4 is inserted a glass tube 9 of external diameter 9 mm and internal diameter 6 mm which in its upright position projects above the base portion to form a weir 7 and projects below the base portion to form a downcomer 8. The plate is mounted by means of the lockpin 13 on a shaft 12, which is also provided with opposing holes across the axis thereof. The plates on the shaft are inserted in a column 11 in such a manner that the downcomer from each plate is positioned over the non-perforated segment 6 of the plate beneath as shown in FIG. 3.

In order to compare the performance of the plates of this invention with those of a conventional Oldershaw column, the following distillations were carried out.

Three 50 mm diameter sieve plate columns were compared for their efficiency in separating a mixture of ca. 20% methylcyclohexane, 80% toluene. One column was a 5-plate Oldershaw column (1.1 mm perforations), and the other two columns were columns according to the present invention each comprising a set of 5 PTFE plates (1.1 mm perforations) inserted into a 400 mm long section of DN 50 QVF glass. The two sets of PTFE sieve plates are designated Mark I and Mark II respectively.

Figure 4:
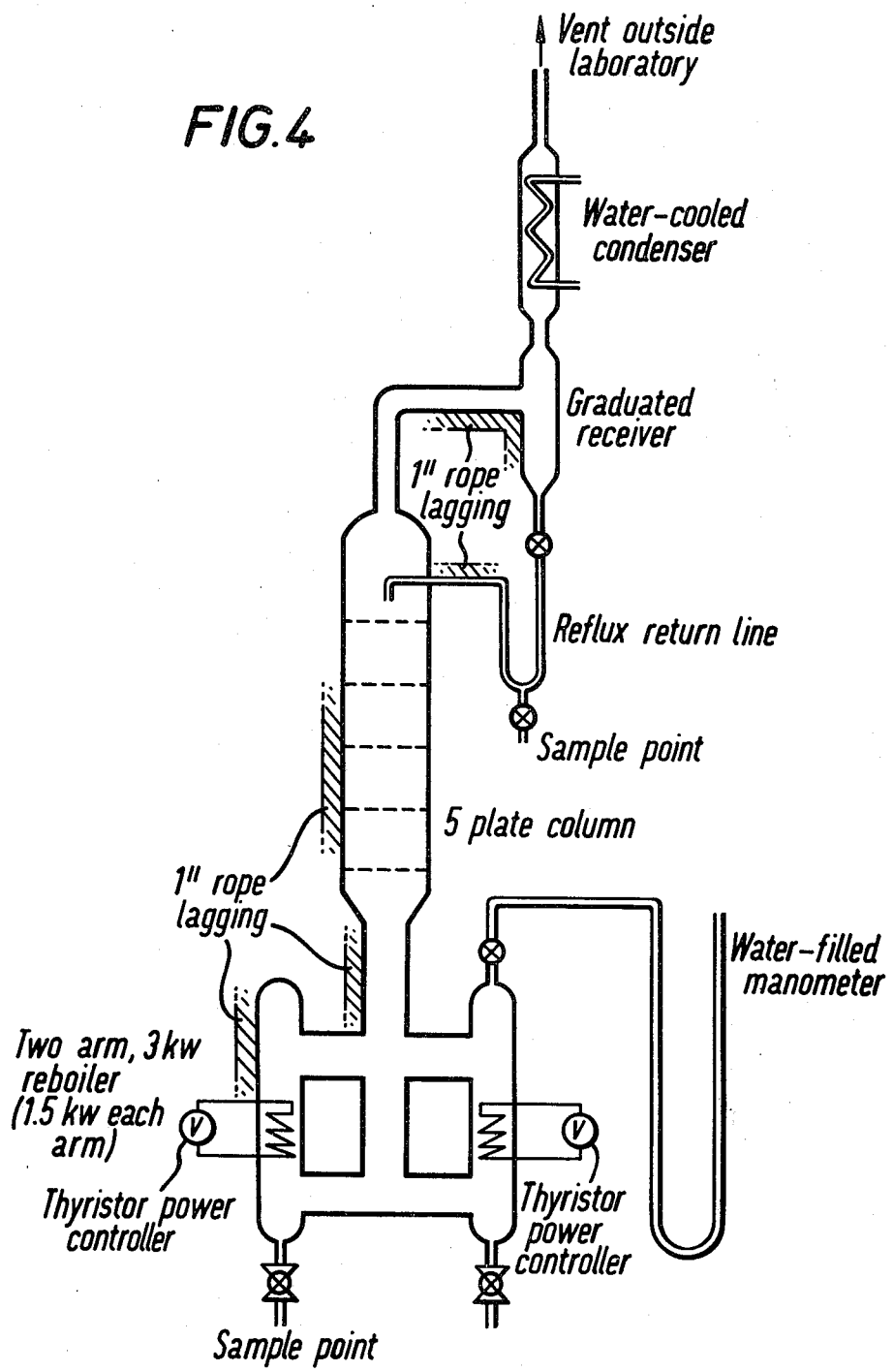
FIG. 4 shows a sketch of a test rig used for evaluating the performance of the plates.

A two-arm, 3 kW metal reboiler controlled by two thyristor power controllers was used to boil-up a charge of ca. 1500 ml of the test mixture. The overhead vapour was fed into the base of a water-cooled condenser and the condensate was returned to the still-head by gravity feed via a graduated receiver (see FIG. 4). Sample points were attached to the reflux line and the reboiler. The pressure drop through the column was measured using a water filled manometer U-tube connected to the vapour space over the reboiler.

For a given test column, the thyristors were set to a specific voltage and the apparatus left to run for ca. 20 hours. After this time samples of liquid were drawn off hourly from the reflux line and the reboiler for analysis by gas chromatography. Readings of the pressure drop in the column were also taken. When consistent analyses were obtained, the receiver tap was closed and the boil-up rate was determined by collecting the reflux. The experiment was then repeated using a new thyristor setting.

For a given pair of heads and bottoms analyses the separation efficiency was determined, employing Fenske's equation. For each run a mean efficiency was calculated along with a "deviation" which indicates the variations in efficiency during each run.

The results for each column are presented in the Tables 1, 2 and 3, and are discussed below.

Table 1—Standard Oldershaw column (not according to the invention).

Table 2—Mark I PTFE plates.

From the comparison of the two types of plate column it can be seen that the PTFE plates have a higher efficiency which is less dependent on boil-up rate than is the case with the Oldershaw column.

The weep point of the Mark I PTFE plates could not be detected. This is a distinct advantage in distillation operation particularly where flexibility is required in exploratory work. However, the operating range of the Mark I PTFE plates was curtailed by a low flood point.

Table 3—Mark II PTFE plates.

In the Mark II plates, in order to increase the flood point and to reduce the pressure drop, the number of holes was increased and the weir height reduced to compare with the Oldershaw design. The plates still retain the very low weep point whilst having an increased flood point comparable with the Oldershaw plate column.

TABLE 1

Summarised Measurements on a 5-plate 50 mm diameter Oldershaw Column (not according to the invention).

| Boil-up rate liter/hour | Mean Overall Efficiency % | Mean Deviation ± % | Column Pressure Loss cm H$_2$O |
|---|---|---|---|
| 2.82 | 72.07 | 1.37 | 4.0 |
| 3.84 | 70.41 | 0.85 | 4.2 |
| 3.96 | 70.00 | 1.04 | 4.2 |
| 4.92 | 74.18 | 1.66 | — |
| 5.52 | 75.01 | 2.28 | 4.5 |
| 5.88 | 77.86 | 2.10 | 4.3 |
| 6.00 | 78.91 | 2.26 | 4.8 |
| 6.84 | 86.58 | 1.5 | — |
| 6.84 | 79.63 | 3.36 | 4.6 |
| 7.44 | 79.25 | 1.24 | 4.7 |
| 7.92 | 80.51 | 1.24 | 4.9 |
| 7.98 | 81.76 | 1.49 | — |
| 8.04 | 77.49 | 1.84 | 4.8 |
| 8.76 | 79.72 | 0.50 | 5.7 |
| 9.24 | 76.31 | 2.30 | 6.5 |
| 10.32 | 72.37 | 1.23 | — |

TABLE 1-continued

Summarised Measurements on a 5-plate 50 mm diameter Oldershaw Column (not according to the invention).

| 10.80 | 66.78 | 1.48 | 8.2 |
|---|---|---|---|

| Dimensions | |
|---|---|
| Hole size (diameter) | 1.1 mm |
| Number of holes | 168 |
| Free area | 9.8% |
| Weir height | 2 mm |
| Operation Conditions | |
| Weep point | ca. 2.8 liters/hour |
| Flood point | ca. 10.8 liters/hour |
| Maximum efficiency | ca. 82% |
| Optimum boil-up rate | ca. 7.2 liters/hour |
| Pressure drop/plate | ca. 0.96 cm water gauge |

TABLE 2

Summarised Measurements on a 5-plate 50 mm diameter column (Mark I PTFE plates).

| Boil-up rate liter/hour | Mean Overall Efficiency % | Mean Deviation ± % | Column Pressure Loss cm H$_2$O |
|---|---|---|---|
| 0.90 | 109.80 | 0.34 | 5.0 |
| 1.44 | 112.55 | 1.15 | 5.0 |
| 1.50 | 111.96 | 1.34 | 4.8 |
| 1.80 | 109.15 | 1.16 | 5.0 |
| 1.86 | 112.98 | 0.43 | 5.2 |
| 2.16 | 111.66 | 1.25 | 5.2 |
| 2.64 | 110.43 | 2.16 | 5.6 |
| 3.06 | 111.58 | 0.50 | 7.0 |
| 3.24 | 113.00 | 2.40 | 8.0 |
| 3.60 | 105.5 | 2.70 | 8.4 |

| Dimensions | |
|---|---|
| Hole size (diameter) | 1.1 mm |
| Number of holes | 68 |
| Free area | 3.4% |
| Weir height | 5 mm |
| Operation Conditions | |
| Weep point | ca. 0 liters/hour |
| Flood point | ca. 3.6 liters/hour |
| Maximum efficiency | ca. 113% |
| Optimum boil-up rate | ca. 3.2 liters/hour |
| Pressure drop/plate | ca. 1-1.8 cm water gauge. |

TABLE 3

Summarised measurements on a 5-plate 50 mm diameter column (Mark II PTFE plates)

| Boil-up rate liter/hour | Mean Overall Efficiency % | Mean Deviation ± % |
|---|---|---|
| 2.12 | 77.8 | ± 3.3 |
| 3.09 | 82.2 | ± 1.9 |
| 5.54 | 85.5 | ± 2.1 |
| 7.2 | 78.1 | ± 0.8 |
| 8.3 | 88.4 | |

| Dimensions | |
|---|---|
| Hole size (diameter) | 1.1 mm |
| Number of holes | 233 |
| Free area | 11.6% |
| Weir height | 2 mm |
| Operating Conditions | |
| Weep point | ca. 0 liters/hour |
| Flood point | ca. 9-9.5 liters/hour |
| Maximum efficiency | ca. 88% |
| Optimum boil-up rate | ca. 8-9 liters/hour |
| Pressure drop/plate | not measured |

We claim:

1. A sieve plate of polymeric material for use in a distillation column, characterised in that said plate comprises:
   (a) a circular base portion provided with
      (i) a central axial aperture adapted to receive a shaft,
      (ii) an additional aperture capable of receiving a tubular member, and
      (iii) a plurality of perforations such that the perforations represent in total a free area of between 3 and 20%, the perforations having a uniform average diameter between 0.6 and 4.0 mm,
   (b) a flexible, flared-lip portion around the circumference of the base portion providing sealing contact with the inner walls of a column and providing a reservoir for downcoming liquid, and
   (c) means for retaining the sieve plate on a shaft.

2. A sieve plate according to claim 1 wherein the perforations are distributed in such a manner that a small segment of the base portion is left unperforated.

3. A distillation column which is provided with a plurality of spaced sieve plates, characterised in that the sieve plates are of polymeric material and are mounted on a central shaft coaxial with the column, said sieve plate comprising:
   (a) a circular base portion provided with
      (i) a central axial aperture adapted to receive the shaft,
      (ii) an additional aperture spaced from the central aperture and capable of receiving a tubular member acting as a weir and a downcomer, and
      (iii) a plurality of perforations such that the perforations represent in total a free area of between 3 and 20%, the perforations having a uniform average diameter between 0.6 and 4.0 mm,
   (b) a flexible, flared-lip portion around the circumference of the base providing sealing contact with the inner walls of the column and providing a reservoir for downcoming liquid, and
   (c) means for retaining the plate on the shaft.

4. A distillation column according to claim 3 wherein the tubular member is constructed of a different material to that of which the sieve plate is made.

5. A distillation column according to claim 3 or 4 wherein the means for retaining the sieve-plate on the shaft is a combination of a coaxial boss with a pair of opposing holes on the plates and correspondingly aligned holes on the shaft enabling a cross-pin or lock-pin to be inserted through the holes in the boss and the shaft to retain the plate in position.

6. A distillation column according to claim 5 wherein the boss is on the side of the plate opposite that bearing the lip portion.

7. A distillation column according to claim 3 or 4 wherein the shaft and the axial aperture in the plate have between them a combination of an annular slot and a flange which mate to form the retaining means.

8. A distillation column according to claim 7 wherein the flange is either an O-ring or an integral projection on the appropriate shaft or plate aperture.

9. A distillation column according to claims 3 or 4 wherein the shaft is provided along its length with a series of means for the purpose of mounting several sieve plates on the shaft said means being adapted to adjust the spacing between the plates and/or the weir height and downcomer length.

10. A distillation column as claimed in claim 3, wherein adjacent sieve plates are arranged so that the liquid descending from the plate immediately above is directed to an unperforated area of the plate below.

* * * * *